United States Patent
Su

[19]

[11] Patent Number: 6,079,322
[45] Date of Patent: Jun. 27, 2000

[54] ROTARY ROASTING FOOD HOLDER FOR A BARBECUE STOVE

[76] Inventor: Yung-Sen Su, P.O. Box 82-144, Taipei, Taiwan

[21] Appl. No.: 09/408,913

[22] Filed: Sep. 30, 1999

[51] Int. Cl.[7] .............................. A47J 37/00; A47J 37/04; A47J 37/07

[52] U.S. Cl. ........................... 99/421 H; 99/419; 99/427; 99/446; 99/450; 99/482

[58] Field of Search ................ 99/339, 340, 419–421 V, 99/400, 401, 444–450, 426, 427, 482, 481; 126/25 R, 9 R, 41 R; 219/400, 401–404, 386

[56] References Cited

U.S. PATENT DOCUMENTS

| | | | |
|---|---|---|---|
| 1,263,331 | 4/1918 | Lindroth | 99/446 |
| 2,618,730 | 11/1952 | Panken | 99/421 H |
| 2,696,163 | 12/1954 | Galley | 99/421 H |
| 2,762,293 | 9/1956 | Boyajian | 99/421 P |
| 2,885,950 | 5/1959 | Stoll et al. | 99/421 H |
| 3,104,605 | 9/1963 | McKinney | 99/421 H |
| 3,125,015 | 3/1964 | Schlaegel | 99/421 P |
| 3,196,776 | 7/1965 | Norton | 99/421 P |
| 3,205,812 | 9/1965 | Booth | 99/421 P |
| 3,296,957 | 1/1967 | Gagnon et al. | 99/444 |
| 3,333,529 | 8/1967 | Wilson | 99/421 P |
| 3,832,989 | 9/1974 | Belford | 126/25 R |
| 4,214,516 | 7/1980 | Friedl et al. | 99/447 |

*Primary Examiner*—Timothy Simone
*Attorney, Agent, or Firm*—A & J

[57] ABSTRACT

A rotary roasting food holder used in a barbecue stove to hold food for roasting, having two end plates, and a plurality of flat pins for joining the end plates and holding food for roasting, the end plates each having a fixed gear at an outer side for coupling to a motor drive inside the barbecue stove, an annular flange around the gear, and a plurality of keyway-like peripheral notches spaced around the annular flange; the flat pins each having two necks near two opposite ends for engaging into the peripheral notches at the end plates and setting into engaged position through a rotary motion of the respective flat pin, and a hooked portion at one end for hooking on the annular flange at one end plate after the respective flat pin has been set into the engaged position.

2 Claims, 6 Drawing Sheets

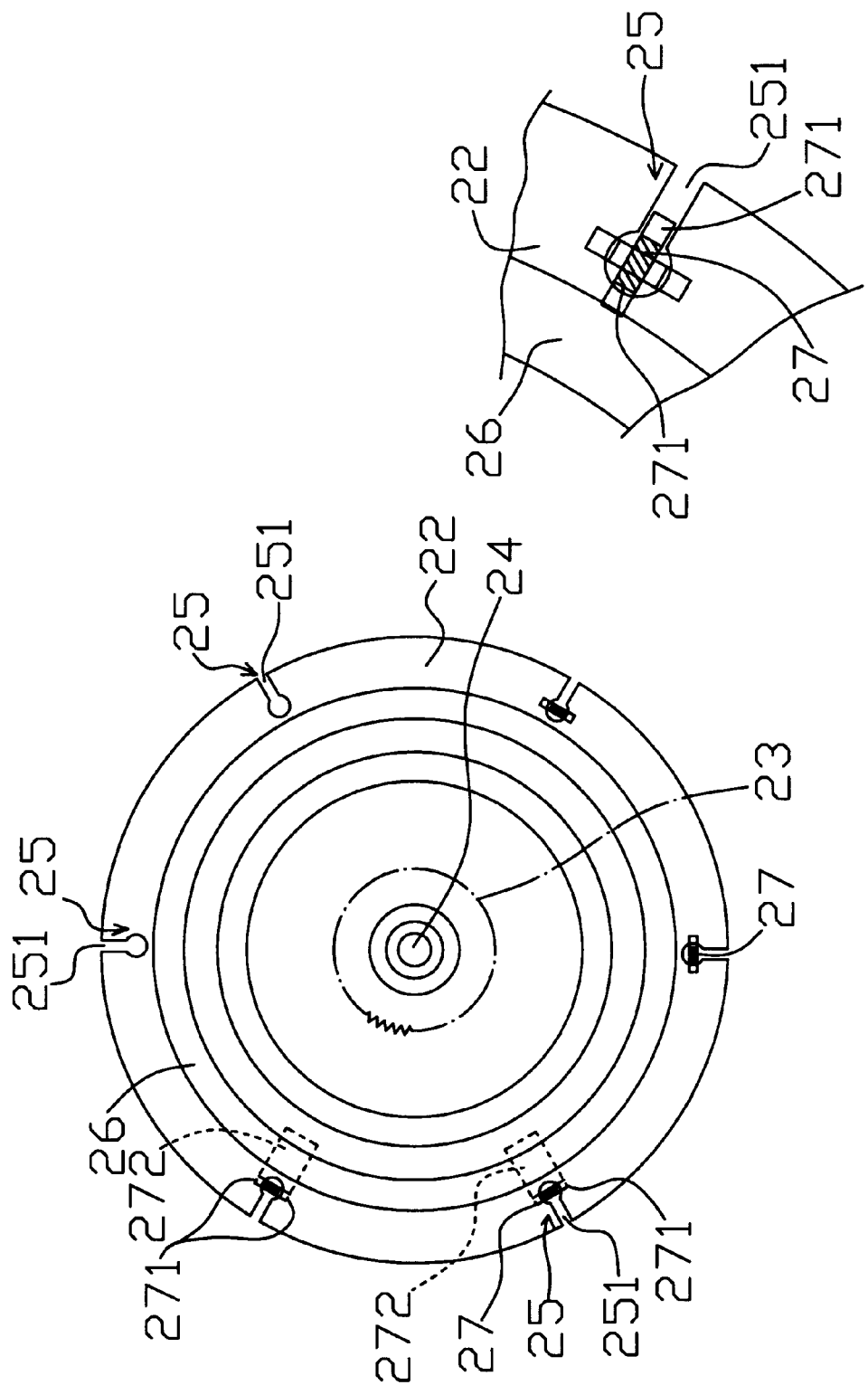

ROTARY ROASTING FOOD HOLDER FOR A BARBECUE STOVE

BACKGROUND OF THE INVENTION

The present invention relates to a barbecue stove, and more specifically to a rotary roasting food holder for a barbecue stove, which fits left-handed users as well as right-handed users.

FIG. 1 is an exploded view of a barbecue stove according to the prior art. This structure of bar-be-cue stove comprises a housing 1, a spindle 11 at the center of the housing 1, an electric heating element 12 vertically disposed in the housing 1 at one side, a pan 14 mounted on the spindle 11, a ring 13 mounted within the housing 1 at the bottom of the pan 14, a rack 15 supported on the pan 14, a disk 16 mounted on the rack 15, and a plurality of pins 163 inserted through respective holes 162 at the disk 16 into respective holes 153 at the rack 15. The pins 163 each have a ring 164 at one end. The rack 15 comprises an upright top 151 having a plurality of protruding portions 152 near the top. The disk 16 has a center hole 161 through which the upright top 151 of the rack 15 is inserted. This structure of barbecue stove is still not satisfactory in function. Because oil and barbecue sauce tends to drop from food to the pan during roasting, oil and barbecue sauce cannot be evenly absorbed by food. When picking up roasted food, the user's hands tend to be scalded. During roasting, the pins 163 tend to be forced out of the barbecue stove, and the disk 16 tends to be vibrated on the rack 15. Furthermore, the pins 163 are not suitable for a left-handed user, and may be stuck in the housing 1 or electric heating element 12.

SUMMARY OF THE INVENTION

Then present invention has been accomplished to provide a barbecue stove, which eliminates the aforesaid drawbacks. It is one object of the present invention to provide a rotary roasting food holder for a barbecue stove, which fits left-handed users as well as right-handed users. It is another object of the present invention to provide a rotary roasting food holder for a barbecue stove, which can be easily detachably assembled, and positively installed and rotated in the barbecue stove for roasting food. To achieve these and other objects of the present invention, there is provided a rotary roasting food holder for a barbecue stove, which comprises two end plates, two gears respectively fixedly provided at the end plates at an outer side, two axle bearings respectively provided at the center of the gears for supporting the rotary roasting food holder inside the housing of a barbecue stove, and a plurality of flat pins detachably mounted between the end plates for holding food for roasting, wherein the end plates each comprise an annular flange spaced around the respective gear, and a plurality of keyway-like peripheral notches spaced around the annular flange; the flat pins are respectively inserted into the peripheral notches at the end plates, each comprising a front end, a rear end, two necks respectively disposed near the front end and the rear end for engaging into a respective keyway-like peripheral notch at each of the end plates, and a hooked portion formed integral with the front end for hooking on the annular flange at one of the end plates.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4 is a plain end view of the present invention, showing the installation of the flat pins in the peripheral notches at the end plates.

FIG. 5 is a schematic drawing showing the flat pin rotated in the respective peripheral notch at one end plate according to the present invention.

DETAILED DESCRIPTION OF THE PREFERRED EMBODIMENT

Figure 1:
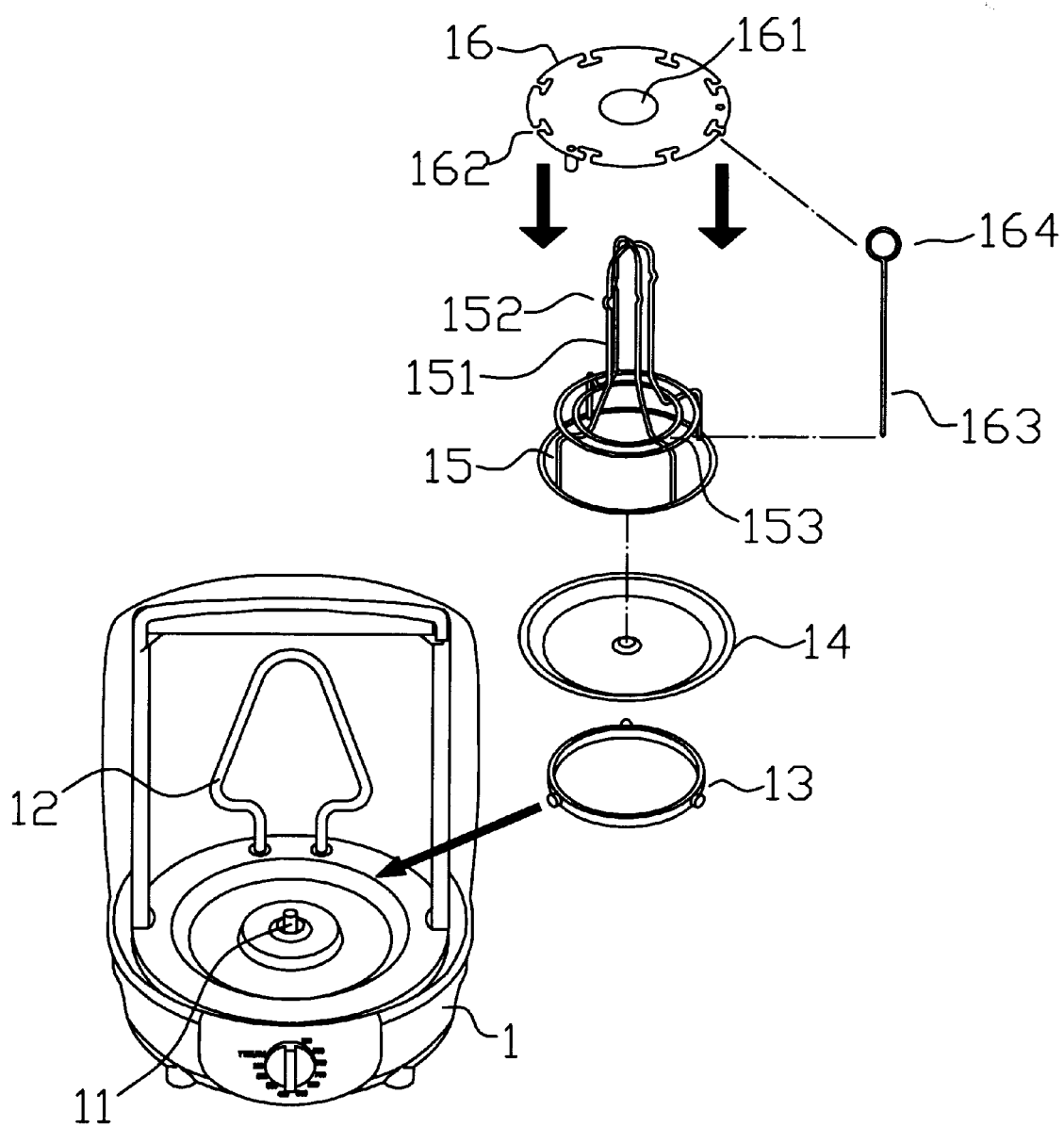
FIG. 1 is an exploded view of a barbecue stove according to the prior art.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled fin the art to which the invention relates.

Figure 2:
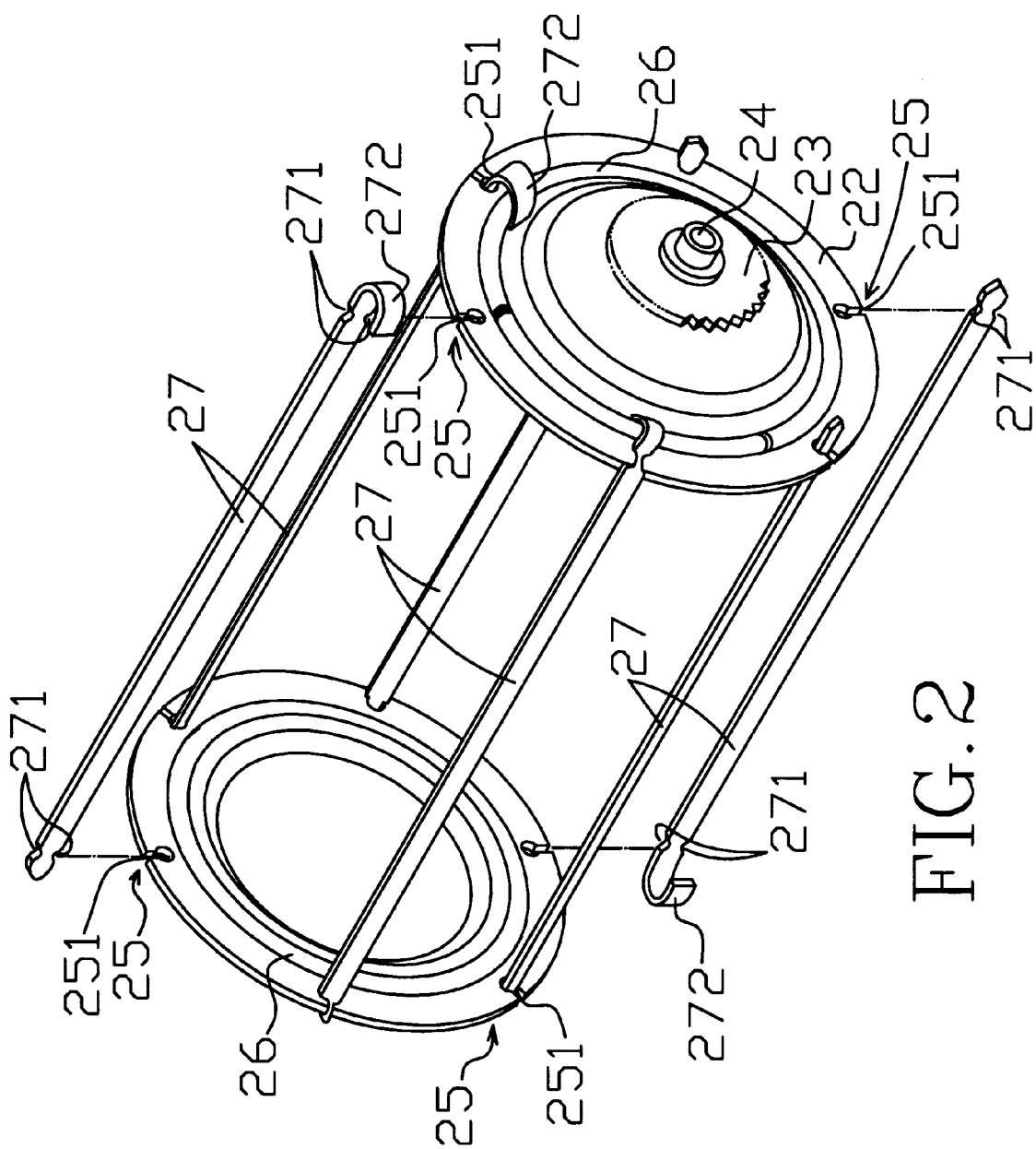
FIG. 2 is an exploded view of a rotary roasting food holder for a barbecue stove according to the present invention.
Figure 7:
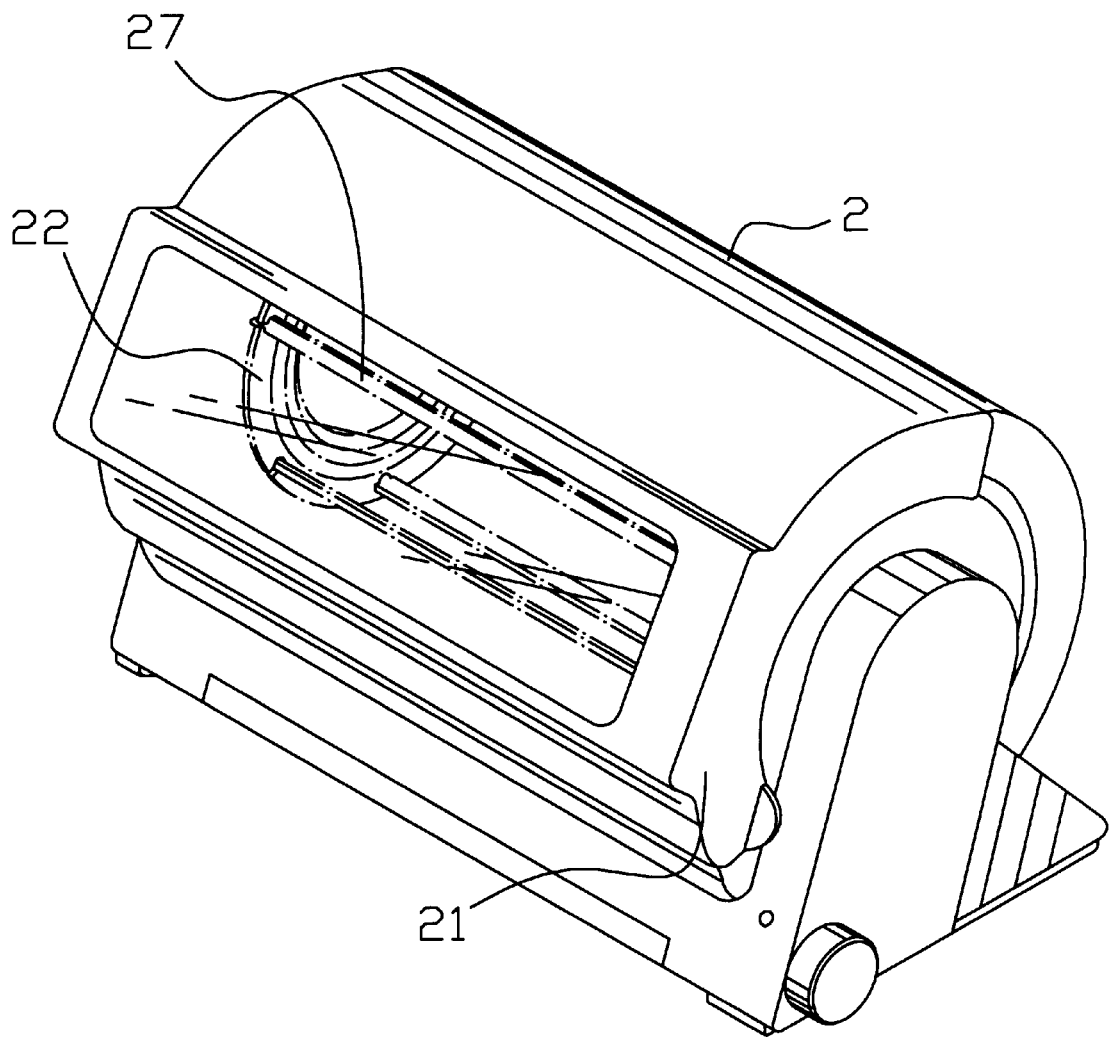
FIG. 7 is a perspective view of a barbecue stove according to the present invention.

Referring to FIGS. 2 and 7, a barbecue stove is shown comprised of a horizontal housing 2 having a movable cover 21, and a rotary roasting food holder mounted inside the housing 2 to hold meat for roasting. The rotary roasting food holder comprises two end plates 22, two gears 23 respectively fixedly provided at the end plates 22 at an outer side, two axle bearings 24 respectively provided at the center of the gears 23 for supporting the rotary roasting food holder inside the housing 2, and a plurality of flat pins 27 detachably mounted between the end plates 22 for holding food for roasting. The end plates 22 each comprise an annular flange 26, and a plurality of keyway-like peripheral notches 25 equiangularly spaced around the annular flange 26. The peripheral notches 25 each are comprised of a round hole and a narrow opening 251 extended from the round hole to the periphery of the respective end plate 22. The pins 27 each comprise two necks 271 near two ends, and a hooked portion 272 at one end. When one pin 27 is inserted into through the narrow opening 251 at one peripheral notch 25 at each of the two end plates 22 into the round hole of the respective peripheral notch 25 at each of the two end plates 22, it is rotated leftwards or rightwards through 90°, enabling the necks 271 to be engaged into the round hole of the respective peripheral notch 25 at each of the end plates 22, and at the same time the hooked portion 272 of the pin 27 is hooked on the annular flange 26 at one end plate 22. When all the pins 27 are installed in the peripheral notches 25 at the end plates 22, the pins 27 are firmly secured to the end plates 22. When removing the pins 27 from the end plates 22, the aforesaid installation procedure is performed in the reversed direction.

Figure 3:
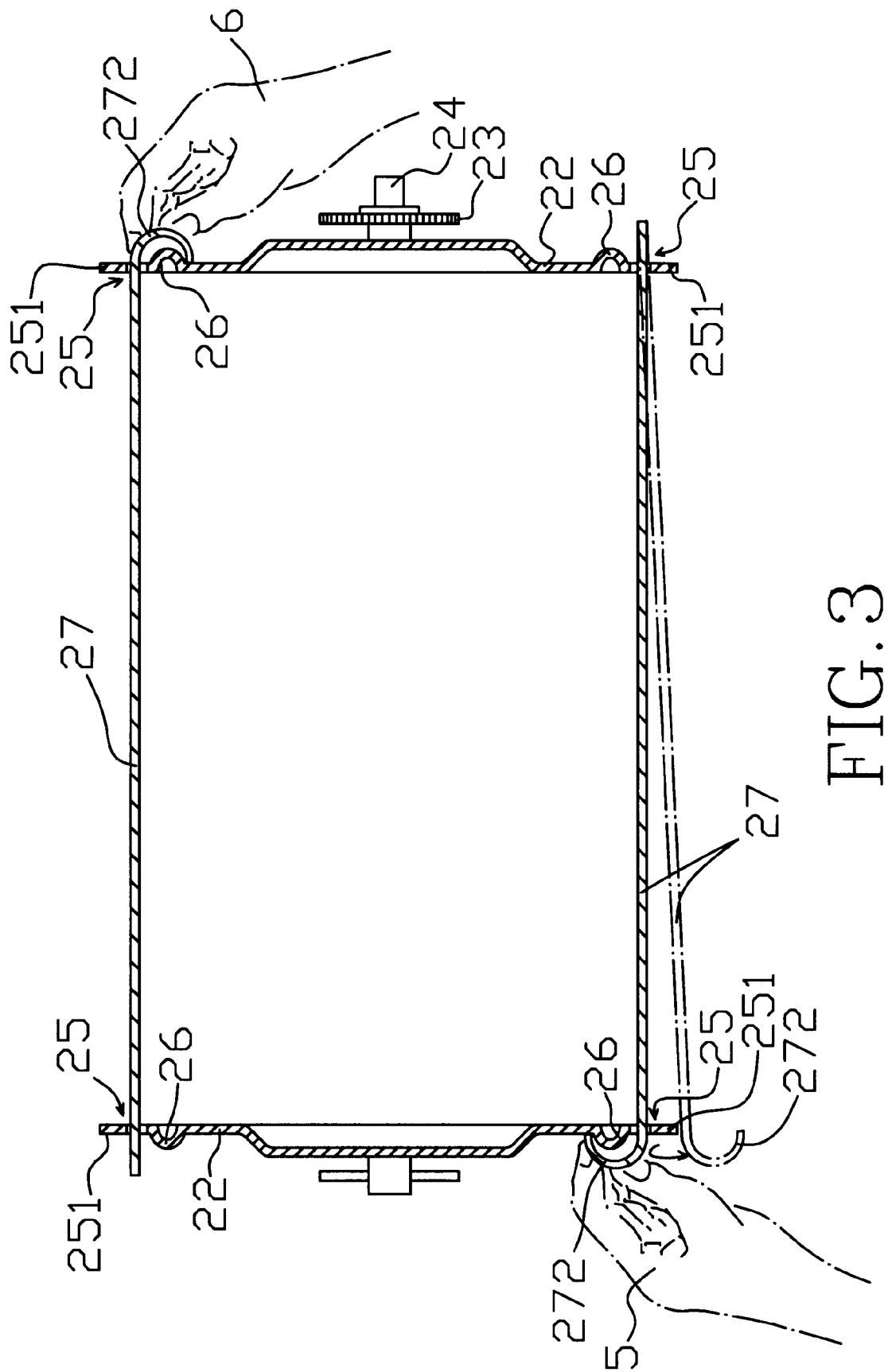
FIG. 3 is a schematic drawing showing the installation of the flat pins with the left hand and the right hand respectively.

Referring to FIG. 3, because the end plates 22 are symmetrical, the pins 27 can be installed in the end plates 22 with the hooked portion 272 of each of the pins 27 hooked on either end plate 22. Therefore, the pins 27 can easily be installed in the end plates 22 by a left-handed user as well as a right-handed user, i.e., the pins 27 can be installed in the end plates 22 at either of two reversed directions subject to the user's preference. When installed, the pins 27 are firmly secured to the peripheral notches 25 at the end plates 22. Unless the pins 27 are rotated through 90° relative to the end plates 22, they cannot be disconnected from the end plates 22.

Figure 6:
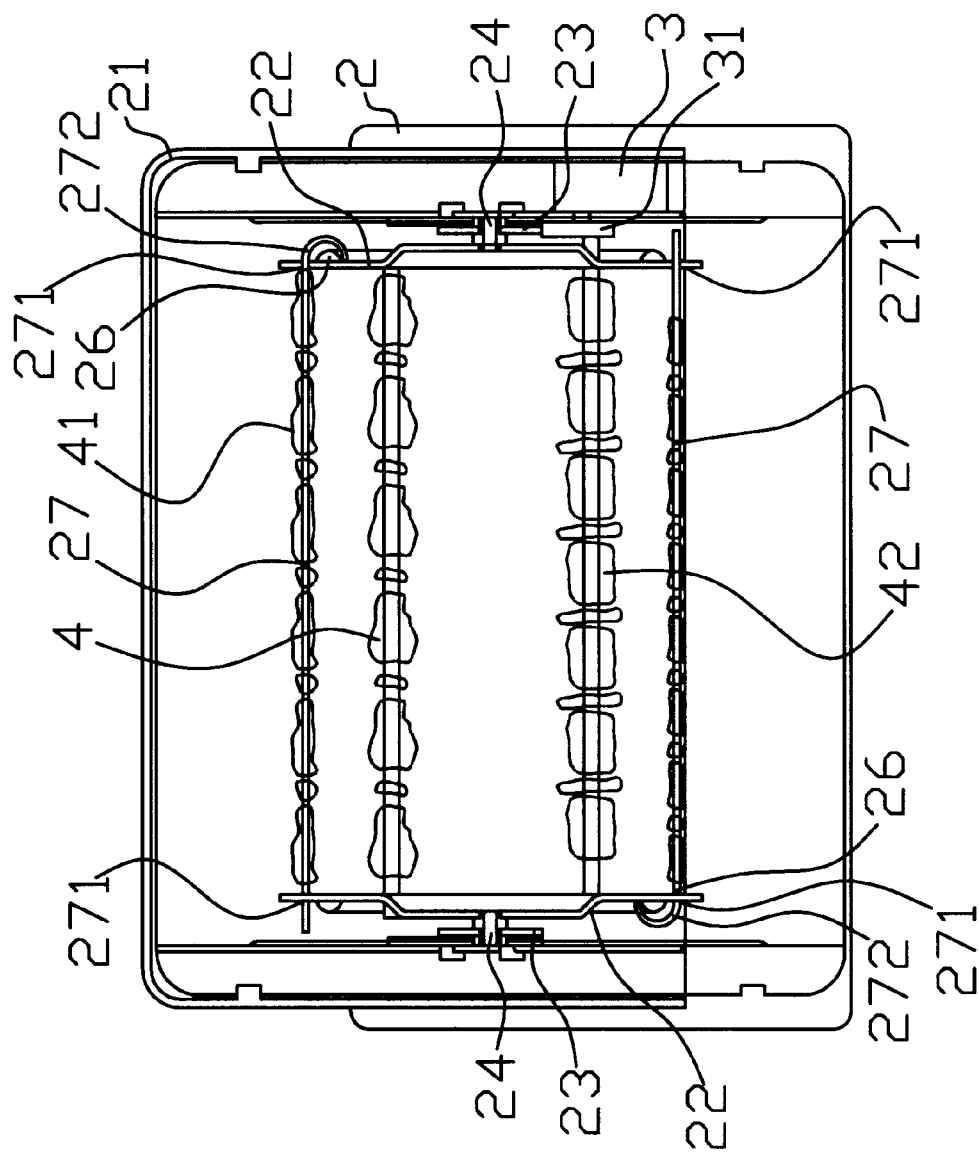
FIG. 6 is a schematic drawing showing an application example of the present invention.

Referring to FIGS. 4, 5 and 6, the width of the flat pins 27 is greater than the width of the narrow opening 251 of each peripheral notch 25 and the diameter of the round hole of each peripheral notch 25, and the thickness of the flat pins 27 is shorter than the width of the narrow opening 251 of each peripheral notch 25 and the diameter of the round hole of each peripheral notch 25, however the width of the necks 271 of the flat pins 27 is smaller than the diameter of the round hole of each peripheral notch 25 but greater than the width of the narrow opening 251 of each peripheral notch 25. Therefore, by aiming the thickness of each flat pin 27 at the narrow opening 251 at each peripheral notch 25 respectively, the flat pins 27 can be respectively inserted into the peripheral notches 25 at the end plates 22. After insertion, the flat pins 27 are rotated through 90°, enabling the necks 271 of the flat pins 27 to be engaged in the round hole of each of the peripheral notches 25. Before installation of the flat pins 27, sweet pepper 4, sausage 41, meat 42, etc. are fastened to the flat pins 27. The rear end (the end remote from the hooked portion 272) of each flat pin 27 is a pointed tip, therefore the flat pins 27 can easily be pierced through sweet pepper 4, sausage 41, meat 42, etc. After installation of the rotary roasting food holder in the housing 2 of the barbecue stove, the gear 23 at one end plate 22 is engaged with a pinion 31 at the output shaft of a motor 3 inside the housing 2 of the barbecue stove. When the motor 3 is started, the rotary roasting food holder is rotated, enabling food to be evenly roasted.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A rotary roasting food holder for use in a barbecue stove to hold food for roasting, comprising two end plates, two gears respectively fixedly provided at said end plates at an outer side, two axle bearings respectively provided at the center of said gears for supporting the rotary roasting food holder inside the housing of a barbecue stove, and a plurality of flat pins detachably mounted between said end plates for holding food for roasting, wherein said end plates each comprise an annular flange spaced around the respective gear, and a plurality of keyway-like peripheral notches spaced around said annular flange; said flat pins are respectively inserted into the peripheral notches at said end plates, each comprising a front end, a rear end, two necks respectively disposed near said front end and said rear end for engaging into a respective keyway-like peripheral notch at each of said end plates, and a hooked portion formed integral with said front end for hooking on the annular flange at one of said end plates.

2. The rotary roasting food holder of claim 1 wherein the rear end of each of said flat pins is a pointed tip.

* * * * *